(12) United States Patent
Mitsuo et al.

(10) Patent No.: US 6,431,485 B2
(45) Date of Patent: Aug. 13, 2002

(54) AUTOMOTIVE SEATBELT TAKE-UP DEVICE

(75) Inventors: Sadaaki Mitsuo; Masahito Wakahara; Norikazu Akamatsu; Kazuhiro Osaki, all of Kyoto (JP)

(73) Assignees: Suncall Kabushiki Kaisha, Kyoto; Kabushiki Kaisha Tokai-Rika-Denki-Seisakusho, Aichi, both of (JP)

( * ) Notice: Subject to any disclaimer, the term of this patent is extended or adjusted under 35 U.S.C. 154(b) by 0 days.

(21) Appl. No.: 09/772,248

(22) Filed: Jan. 29, 2001

(30) Foreign Application Priority Data

Mar. 16, 2000 (JP) ........................................ 2000-074362

(51) Int. Cl.⁷ .............................................. B60R 22/44
(52) U.S. Cl. ..................................... 242/372; 242/375.1
(58) Field of Search ................................. 242/372, 375, 242/375.1, 375.3; 280/806, 807; 297/475–478

(56) References Cited

U.S. PATENT DOCUMENTS

| | | | | |
|---|---|---|---|---|
| 4,026,494 A | * | 5/1977 | Tanaka | 242/372 |
| 4,108,393 A | * | 8/1978 | Henderson | 242/375 |
| 4,303,208 A | * | 12/1981 | Tanaka | 242/372 |
| 4,361,294 A | | 11/1982 | Doty | |
| 5,131,594 A | * | 7/1992 | Refior et al. | 242/372 |
| 5,265,823 A | | 11/1993 | Doty | |
| 5,285,982 A | * | 2/1994 | Kopetzy | 242/372 |
| 5,411,221 A | * | 5/1995 | Collins et al. | 242/372 |
| 5,558,293 A | * | 9/1996 | Hirase et al. | 242/372 |

FOREIGN PATENT DOCUMENTS

JP  8-5879  2/1996

\* cited by examiner

Primary Examiner—John M. Jillions
(74) Attorney, Agent, or Firm—Darby & Darby (57) ABSTRACT

An automotive seatbelt take-up device has a primary spiral spring biasing a take-up shaft in a seatbelt take-up direction. A spring clutch transfers rotation of the take-up shaft in a seatbelt drawing-out direction to a ring. A secondary spiral spring is capable of generating rotational biasing force on the take-up shaft in a direction opposite that of the primary spiral spring. Thus, the present invention provides an automotive seatbelt take-up device that can reduce both the drawing-out force and the take-up force of a seatbelt when the seatbelt is being worn.

5 Claims, 6 Drawing Sheets

| | rotation restriction on ratchet wheel (in take-up direction) | spring clutch | secondary spiral spring | take-up force / pulling force |
|---|---|---|---|---|
| I | no | locked | free state | normal |
| II | yes | friction transfer | wound up | reduced |
| III | yes | ------ | wound up | reduced |
| IV | yes | locked | released (assisted) | reduced |
| V | no | friction transfer | free state | normal |

Row labels (first column, descriptions):
- I: drawing out belt when belt is not worn
- II: take-up of belt when belt is worn
- III: stable state when belt is worn
- IV: drawing out of belt by less than predetermined amount when belt is worn
- V: take-up of belt is not worn

AUTOMOTIVE SEATBELT TAKE-UP DEVICE

BACKGROUND OF THE INVENTION

The present invention relates to an automotive seatbelt take-up device. More specifically, the present invention relates to a device that significantly reduces pressure applied by the seatbelt on the passenger when the seatbelt is worn.

Automotive seatbelts constrain passenger bodies to their seats to protect the passengers from collisions. A seatbelt take-up device includes a spiral spring used to take-up the seatbelt. When the seatbelt is to be secured, the seatbelt is drawn out in opposition to the spring force from the spiral spring, and a tongue is inserted into a buckle. The spiral spring biases the seatbelt in the take-up direction so that the seatbelt is tightened around the chest of the passenger, and the passenger feels pressure from the seatbelt. Thus, there is a need to reduce the take-up force from the seatbelt when the seatbelt is worn, thus easing the tightening at the chest, reducing the pressure felt by the passenger, and improving comfort.

Japanese patent publication number 60-30576 describes a take-up device implemented to reduce the seatbelt take-up force. Two spiral springs, one weak and one strong, having different elastic biasing forces, are connected in series. The weak and strong spiral springs are used when the seatbelt is drawn out or taken in. When the seatbelt is worn, the weak spring is used to reduce the take-up force. However, this take-up device uses two spiral springs, resulting in a complex structure having high production costs.

Japanese laid-open patent publication number 10-78786 proposes a seatbelt take-up device to reduce the take-up force when the seatbelt is worn. This conventional seatbelt take-up device has a spring clutch which provides a braking force to the take-up force of the spiral spring.

This conventional take-up device includes a shaft moving in tandem with a seatbelt take-up shaft; a spiral spring biasing the shaft in the take-up direction; a ratchet wheel restricted by a solenoid actuator to prevent rotation in the seatbelt take-up direction when the seatbelt is worn, and a spring clutch assembled along the shaft and the ratchet wheel. The spring clutch provides torque transfer for the clutch spring when the seatbelt is being taken up while being worn. By having the shaft move in tandem with the stopped ratchet wheel, the friction transfer provided by the clutch spring activates a braking force on the shaft, thus reducing the take-up force of the shaft.

In the latter seatbelt take-up device, the spring clutch provides a braking action via friction sliding of the clutch spring when the shaft rotates in the seatbelt take-up direction. However, the friction coefficient of the clutch spring varies greatly due to vibration in the automobile. This variation prevents stable braking action (stable take-up force reduction) and makes it difficult to reliably provide adequate pressure on the seatbelt.

Since the braking action is provided through friction sliding, there is an upper limit on the braking force. Increasing the spring force of the spiral spring to improve the seatbelt take-up performance is difficult. Furthermore, when the seatbelt is drawn out while it is being worn, the spring clutch is practically running in a loose state, with the ratchet wheel rotating as well. This prevents any reduction in the take-up force acting on the shaft. Thus, the seatbelt is drawn out in opposition to the strong take-up force of the spiral spring, resulting in higher pressure from the seatbelt. Furthermore, the rotation of the ratchet wheel generates ratchet noise.

OBJECT AND SUMMARY OF THE INVENTION

It is an object of the present invention to provide an automotive seatbelt take-up device which overcomes the foregoing problems.

It is a further object of the present invention to reliably reduce the take-up force of the seatbelt after the seatbelt is secured to the passenger.

It is another object of the present invention to reduce both the drawing-out force and the take-up force of the seatbelt.

It is still a further object of the present invention to use the elastic force of the spring member to reduce both the drawing-out force and the take-up force of the seatbelt.

It is yet another object of the present invention to allow increased torque from a spiral spring.

Briefly stated, the present invention provides an automotive seatbelt take-up device has a primary spiral spring biasing a take-up shaft in a seatbelt take-up direction. A spring clutch transfers rotation of the take-up shaft in a seatbelt drawing-out direction to a ring. A secondary spiral spring is capable of generating rotational biasing forces on the take-up shaft in a direction opposite that of the primary spiral spring. Thus, the present invention provides an automotive seatbelt take-up device that can reduce both the drawing-out force and the take-up force of a seatbelt when the seatbelt is being worn.

According to an embodiment of the present invention, there is provided an automotive seatbelt take-up device includes a take-up shaft operating in tandem with an automotive seatbelt take-up shaft; a primary spiral spring fixed to the take-up shaft, biasing the take-up shaft in a take-up direction; and a balance spring capable of generating a rotational bias force in a direction opposite that of the primary spiral spring. The balance spring may be a secondary spiral spring roughly similar to the primary spiral spring with fewer windings, or, alternatively, the balance spring can be a torsion spring.

It is possible to have the rotational bias force generated by the balance spring (this is a rotational bias force going in the opposite direction from the primary spiral spring) act upon the take- up shaft when the seatbelt is secured to the passenger. If this is done, when the seatbelt is taken up after it is secured, the balance spring is wound tight so that the take-up force of the take-up shaft is reduced. If the seatbelt is subsequently drawn out, a release elastic force, releasing the balance spring that had been wound tight, assists the take-up shaft in the drawing-out direction.

According to another embodiment of the present invention, there is provided an automotive seatbelt take-up device includes a take-up shaft operating in tandem with an automotive seatbelt take-up shaft; a primary spiral spring fixed to the take-up shaft at its inner end portion and biasing the take-up shaft in a take-up direction; a spring clutch including a ring and a clutch spring fitted to the outside of the take-up shaft and transferring rotation in a seatbelt drawing-out direction to the ring; a balance spring capable of generating a rotational bias force in a direction opposite to that of the primary spiral spring, one end of the balance spring being fixed to the ring; and a ratchet wheel capable of using restricting means to restrict rotation in a seatbelt take-up direction, another end of the balance spring being fixed to the ratchet wheel.

The balance spring here can be, for example, a secondary spiral spring similar to the primary spiral spring with fewer windings (e.g., around 3–10 windings). Alternatively, a torsion spring similar to this secondary spiral spring can be used as the balance spring.

The restricting means is not activated until the seatbelt is secured to the passenger, and the balance spring is in a free state since the ratchet wheel can rotate freely. When the seatbelt is secured to the passenger and the tongue and buckle are connected, restricting means restricts rotation of the ratchet wheel so that it cannot rotate in the take-up direction. When slack in the seatbelt is to be taken up from this state, the friction transfer provided by the spring clutch is used to transfer the rotation of the take-up shaft to the ring, rotating the ring so that the balance spring is wound tight. In this manner, the take-up force of the take-up shaft is reliably reduced by the tightly wound state of the balance spring, and the passenger is only weakly constrained by the seatbelt.

When the seatbelt is worn and the passenger's body is moved to draw out the seatbelt, the spring clutch is in a transferring state so that the release elastic force of the balance spring assists the take-up shaft. Thus, the passenger is only weakly constrained by the seatbelt. Next, when the passenger's body returns to its original position and the seatbelt needs to be taken up, the friction transfer provided by the spring clutch causes the balance spring to be wound tightly, as described above, and the take-up force of the take-up shaft is reduced by the tightly wound state of the balance spring. This state results in the passenger being only weakly constrained by the seatbelt.

When the seatbelt is to be removed from the passenger's body and the tongue is removed from the buckle, the restriction provided by restricting means on the ratchet wheel is released and the ratchet wheel is allowed to rotate freely. Thus, with the balance spring in a free state, the seatbelt is rapidly and firmly taken in by the take-up force of the primary spiral spring.

According to a feature of the present invention, there is provided an automotive seatbelt take-up device as described above wherein, when the seatbelt is being worn by a passenger and the take-up shaft rotates in the take-up direction while the ratchet wheel applies rotation restriction, the spring clutch provides friction transfer to wind the balance spring tight, thus reducing take-up force from the take-up shaft. Generally, slack in the seatbelt is taken up after the seatbelt is secured to the passenger. When the take-up shaft is rotated in the take-up direction while the ratchet wheel is restricted, the friction transfer provided by the spring clutch winds the balance spring tightly and reduces the take-up force of the take-up shaft.

According to another feature of the present invention, there is provided an automotive seatbelt take-up device as described above wherein, when the seatbelt is being worn and the seatbelt is drawn out while the ratchet wheel applies rotation restriction, a release elastic force of the balance spring assists, by way of the spring clutch, the take-up shaft in the drawing-out direction.

When the passenger's body moves while the seatbelt is secured, the seatbelt is drawn out. Since the balance spring is wound tight up to this point, as described above, when the seatbelt is drawn out, the release elastic force of the balance spring can, via the spring clutch, assist the take-up shaft in the drawing-out direction. Thus, the passenger experiences only a weak constraining force.

According to a further feature of the present invention there is provided an automotive seatbelt take-up device as described above wherein, when the seatbelt is taken up after being drawn out, the spring clutch provides friction transfer to wind the balance spring tight, thus reducing take-up force of the take-up shaft. When the seatbelt is to be taken up after it is drawn out, as described above, the friction transfer of the spring clutch winds the balance spring tightly, thus reducing the take-up force of the take-up shaft.

According to another feature of the present invention, there is provided an automotive seatbelt take-up device as described above, wherein the balance spring is a spiral spring. Since the balance spring is a spiral spring, the balance spring can be mounted. for example, between the ring and the ratchet wheel. This provides a more compact take-up device.

According to another feature of the present invention, there is provided an automotive seatbelt take-up device as described above, wherein the balance spring is a torsion spring. Since the balance spring is a torsion spring, the production cost of the balance spring is reduced.

The above, and other objects, features and advantages of the present invention will become apparent from the following description read in conjunction with the accompanying drawings, in which like reference numerals designate the same elements.

DETAILED DESCRIPTION OF THE INVENTION

Referring to the figures, the following is a description of an embodiment of the present invention. This embodiment presents an example where the present invention is implemented in a take-up device used to take up a passenger-restraining seatbelt equipped in an automobile. References to front/rear and left/right will be based on the orientation of FIG. 1.

Figure 1:
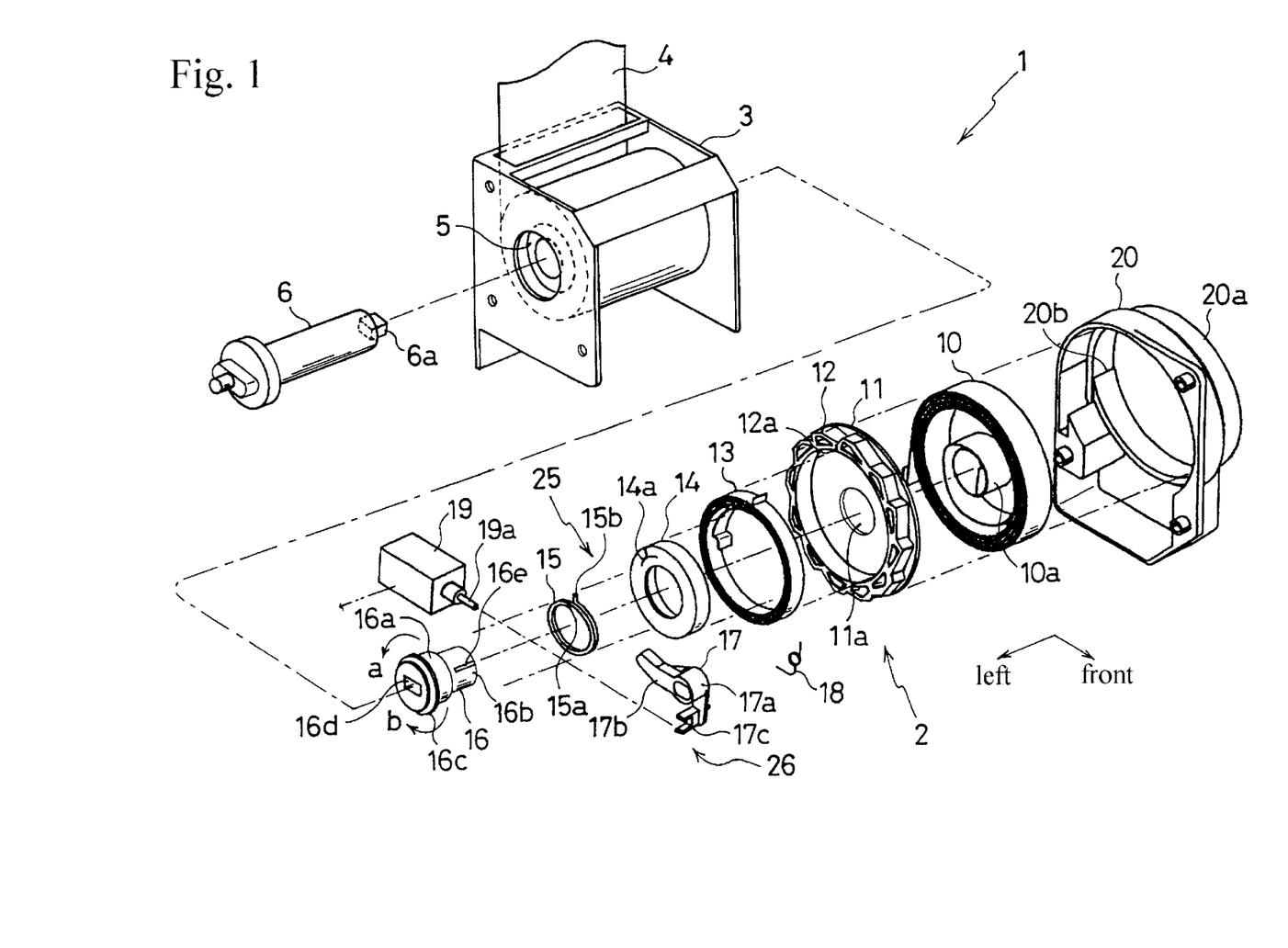
FIG. 1 is an exploded perspective drawing of a seatbelt device according to an embodiment the present invention.
Figure 2:
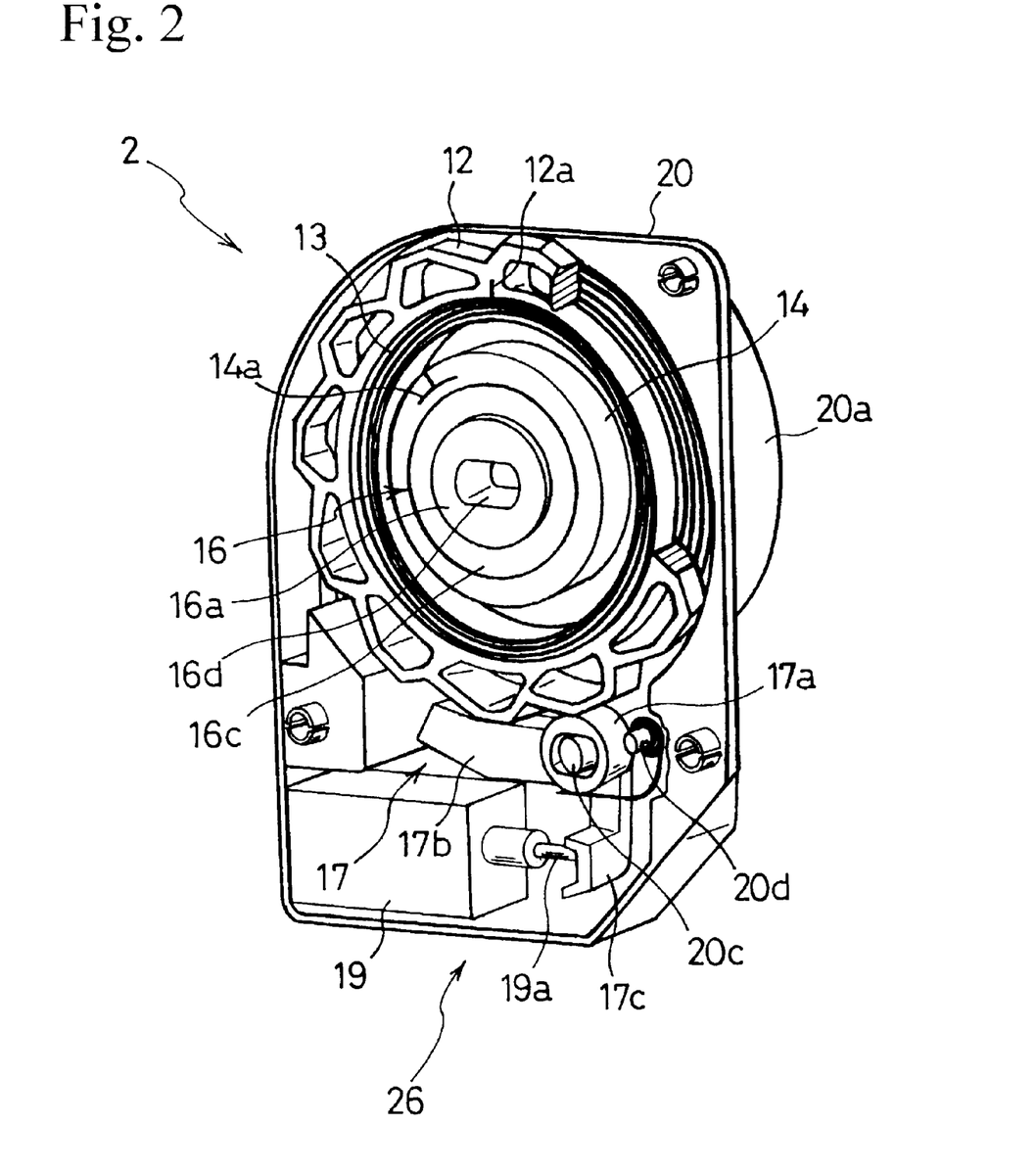
FIG. 2 is a perspective drawing of a take-up device.
Figure 3:
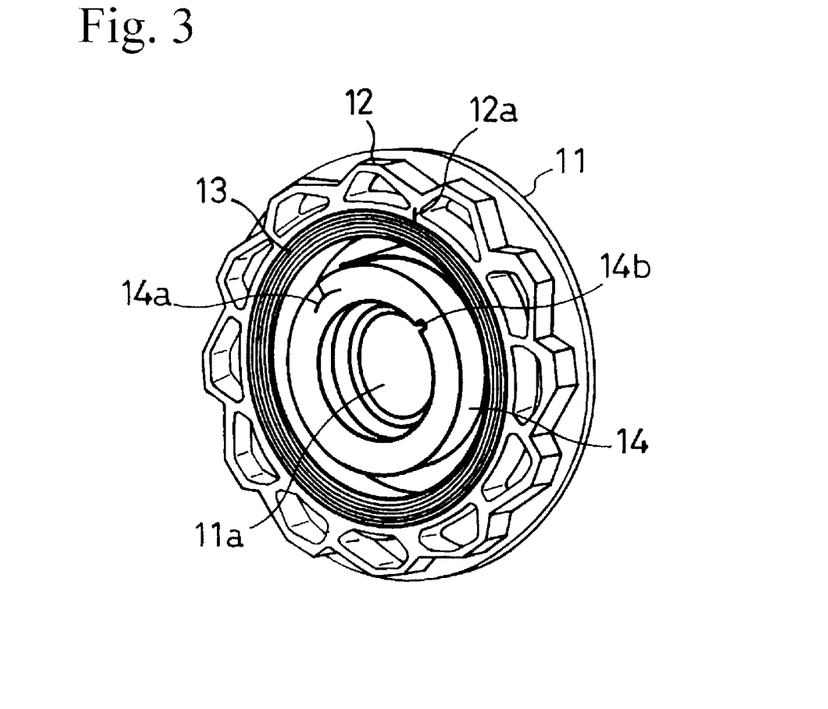
FIG. 3 is a schematic perspective drawing of a take-up device.

Referring to FIG. 1, a seatbelt device 1 includes a take-up device 2, a housing 3, a reel 5 housed in housing 3 to reel in a seat belt 4, and a seat-belt take-up shaft 6 (hereinafter referred to as take-up shaft 6) secured by being fitted inside reel 5, passing through reel 5 so that take-up shaft 6 is rotatably supported in housing 3.

Referring to FIGS. 1 through 6, take-up device 2 includes a primary spiral spring 10, a disk 11, a ratchet wheel 12, a secondary spiral spring 13 (also known as balance spring 13), a ring 14, a clutch spring 15, a take-up shaft 16, a ratchet claw 17, a torsion spring 18, and a solenoid actuator 19. These members 10–19 are housed inside a case member 20 secured to the right wall of housing 3.

Primary spiral spring 10 is housed in a cap 20a at the right of case member 20. Disk 11 and ring-shaped ratchet wheel 12 are disposed to the left of primary spiral spring 10. Disk 11 is secured to ratchet wheel 12. Secondary spiral spring 13 is secured to the inside of ratchet wheel 12. Ring 14 is disposed in secondary spiral spring 13. Clutch spring 15 is disposed inside ring 14. Disk 11 is rotatably housed in case member 20, and ratchet wheel 12 is rotatable around the axis of take-up shaft 6.

Figure 4:
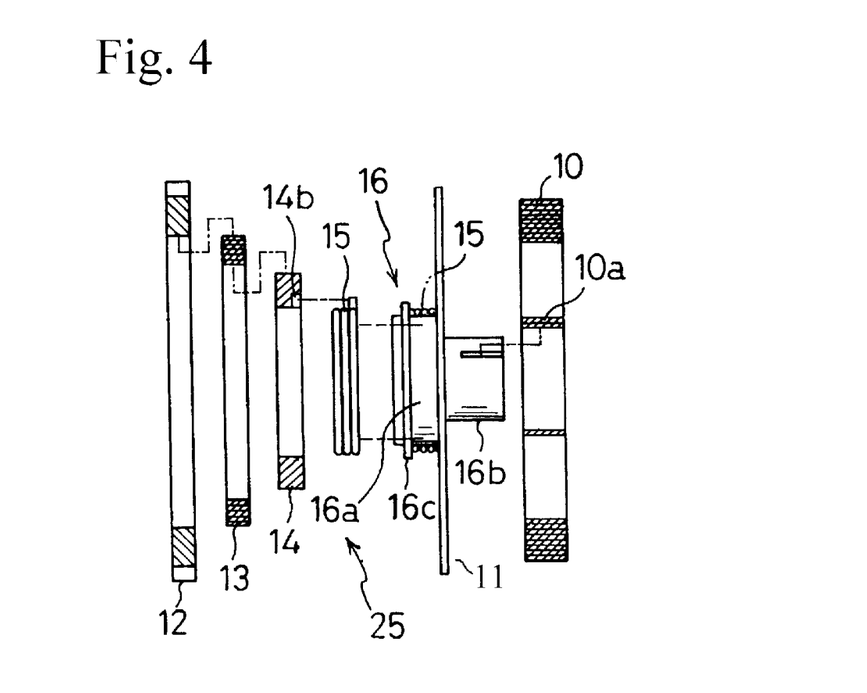
FIG. 4 is an exploded vertical cross-section drawing of the main elements of a take-up device.

Take-up shaft 16 is integrally formed from a first shaft 16a, a second shaft 16b, to the right thereof (with a smaller diameter than the first shaft 16a), and a flange 16c, near the left end of first shaft 16a. A rectangular hole 16d, on first shaft 16a, is fitted with a rectangular connector 6a on the right end of take-up shaft 6, linking take-up shaft 16 and take-up shaft 6.

First shaft 16a is disposed inside clutch spring 15 and ring 14. Second shaft 16b, passing through an insertion opening 11a of disk 11 is disposed inside primary spiral spring 10. Flange 16c is roughly abutted against the left surface of ring 14. A rightwardly projecting shaft (not shown in the figure) is formed on the right end of take-up shaft 16. This shaft is rotatably supported by a cavity (not shown in the figure) at the center of case member 20.

Referring now to FIG. 1. an arrow a indicates the rotation direction (take-up direction) of take-up shaft 16 (take-up shaft 6) when seat belt 4 is reeled in. An arrow b indicates the rotation direction (drawing-out direction) of take-up shaft 16 when seatbelt 4 is drawn out.

Primary spiral spring 10 is wound outward from a take-up center section 10a in the direction of the take-up direction a. Take-up center section 10a is secured to take-up shaft 16 by engaging the inner end of primary spiral spring 10 to a slit 16e formed on first shaft 16b. The outer end of primary spiral spring 10 is secured by engaging with an engagement piece 20b formed on the inside of case member 20. Seatbelt 4, wrapped almost completely around reel 5, is drawn out so that take-up shaft 16 rotates in the drawing-out direction b. This causes primary spiral spring 10 to be wound tight, and the resulting biasing causes take-up shaft 6 and take-up shaft 16 to be biased in the take-up direction a.

Secondary spiral spring 13 is wound from the inside outward in the drawing-out direction b, with, e.g., 3–10 windings. The inner end of secondary spiral spring 13 is secured by engaging with a slit 14a formed in ring 14. The outer end of secondary spiral spring 13 is secured by being engaged to a slit 12a formed on ratchet wheel 12. Secondary spiral spring 13 can generate rotational biasing force on take-up shaft 16 in the drawing-out direction b (reverse from primary spiral spring 10).

Clutch spring 15 is a torsion spring formed by tightly winding (e.g., two windings) an elastic wire into a coil shape. Clutch spring 15 is tightly fitted to the outside of first shaft 16a of take-up shaft 16 to provide friction bonding. Clutch spring 15 is wound from one end 15a in the direction of the take-up direction a. The other end 15b is bent upward and engages with an engagement groove 14b formed on the inner perimeter section of ring 14.

Take-up shaft 16, clutch spring 15 and ring 14 form a spring clutch 25 that transfers the rotation of take-up shaft 16 in the drawing-out direction b to ring 14. Thus, when the take-up shaft 16 rotates in the drawing-out direction b, the friction between the take-up shaft 16 and clutch spring 15 causes clutch spring 15 to be wound tighter, so that clutch 25 is in a locked state. Clutch spring 15 and take-up shaft 16 are joined firmly so that torque can be transferred between them, and this allows the rotation of the take-up shaft 16 in the drawing-out direction b to be transferred reliably to the ring 14. When the take-up shaft 16 is rotated in the take-up direction a, the friction transfer provided by the spring clutch 25 results in the rotation of the take-up shaft 16 in the take-up direction a to be transferred to ring 14. In this case, T1>T3>T2, where T1 is the rotational bias force of the primary spiral spring 10, T2 is the rotational bias force of the secondary spiral spring 13, and T3 is the torque transferred without slippage via the frictional transfer provided by spring clutch 25.

Figure 5:
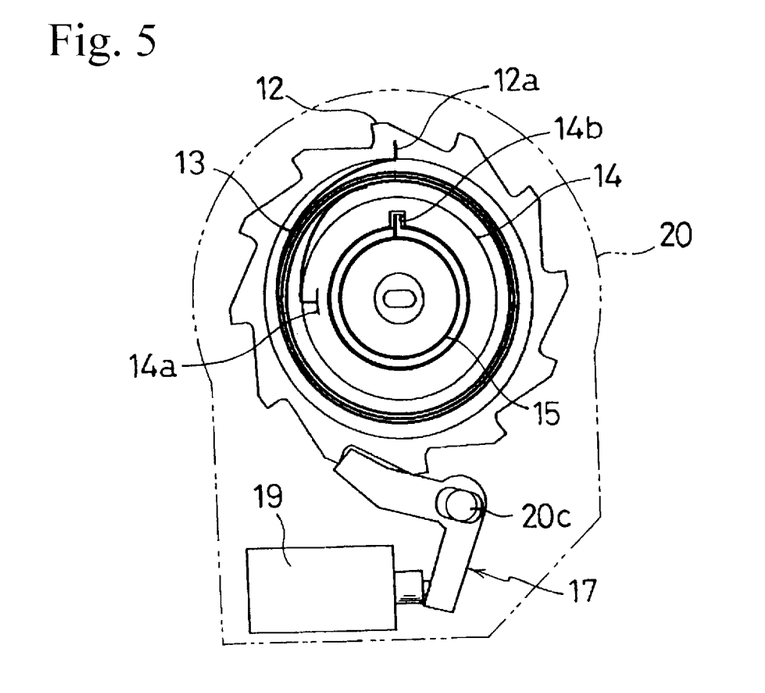
FIG. 5 is a side-view drawing of a take-up device when the rotation of the ratchet wheel is restricted.
Figure 6:
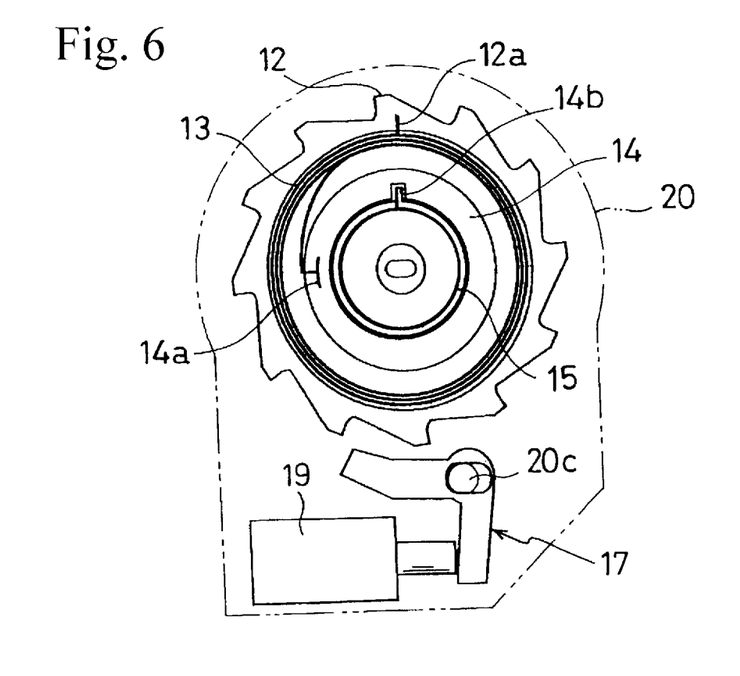
FIG. 6 is a side-view drawing of a take-up device when the rotation of the ratchet wheel is not restricted.

A rotation restricting mechanism 26 includes ratchet claw 17, torsion spring 18, and solenoid actuator 19. Rotation restricting mechanism 26 restricts ratchet wheel 12, preventing it from rotating in the take-up direction a. Ratchet claw 17 is integrally formed from a pivot section 17a, an arm 17b, and a lever 17c. Pivot section 17a is pivotably supported by a support shaft 20c of case member 20 roughly directly below ratchet wheel 12. Arm 17b extends rearward from pivot section 17a and lever 17c extends downward.

Torsion spring 18 is mounted on a pin 20d of case member 20. Torsion spring 18 biases arm 17b in the direction of engagement with the teeth of ratchet wheel 12. Solenoid actuator 19 is secured to case member 20 to the rear of lever 17c. An output section 19a pushes lever 17c forward so that the engagement between arm 17b and ratchet wheel 12 is released.

Although not shown in the figures, seatbelt device 1 is equipped with a tongue attached to seatbelt 4 and a buckle disposed in a fixed manner to the auto body. The passenger wears seatbelt 4 by connecting the tongue and the buckle. Solenoid actuator 19 and a detection switch for detecting the joined state of the buckle are electrically connected to a control device (not shown in the figures). This control device controls solenoid actuator 19 based on the whether or not the tongue and the buckle are joined.

Referring to FIG. 6, solenoid actuator 19 disengages ratchet claw 17 from ratchet wheel 12 when seatbelt 4 is disengaged (i.e., the tongue and the buckle are not joined), allowing ratchet wheel 12 to rotate freely. Referring to FIG. 5, when seatbelt 4 is secured (i.e., the tongue and the buckle are joined), solenoid actuator 19 is turned on. Ratchet claw 17 engages with ratchet wheel 12 to prevent ratchet wheel 12 from rotating in the take-up direction a.

When ratchet wheel 12 can rotate freely, secondary spiral spring 13 can not be wound tight, so no rotational bias force is applied to take-up shaft 16. When seatbelt 4 is being worn by the passenger, the rotation restricting mechanism 26 prevents ratchet wheel 12 from rotating in the take-up direction a. When the rotational bias force of primary spiral spring 10 causes take-up shaft 16 to rotate in the take-up direction a, the friction transfer provided by spring clutch 25 causes ring 14 to rotate in the take-up direction a as well. Secondary spiral spring 13 is wound tight, and a rotational bias force is applied to take-up shaft 16 in the drawing-out direction b.

If secondary spring 13 generates a rotational bias force on take-up shaft 16, in the drawing-out direction B, the rotational bias force will be smaller than the rotational bias force from primary spiral spring 10 in the take-up direction a. In other words, if ratchet wheel 12 is restricted from rotating in the take-up direction a and take-up shaft 16 and ring 14 are rotated too far in the take-up direction a, secondary spiral spring 13 will be wound to a point where a predetermined rotational bias force (a bias slightly smaller than that of primary spiral spring 10). At this point, slippage will take place between clutch spring 15 and take-up shaft 16, thus preventing secondary spiral spring 13 from being wound tighter to produce a greater rotational bias force.

Figure 7:
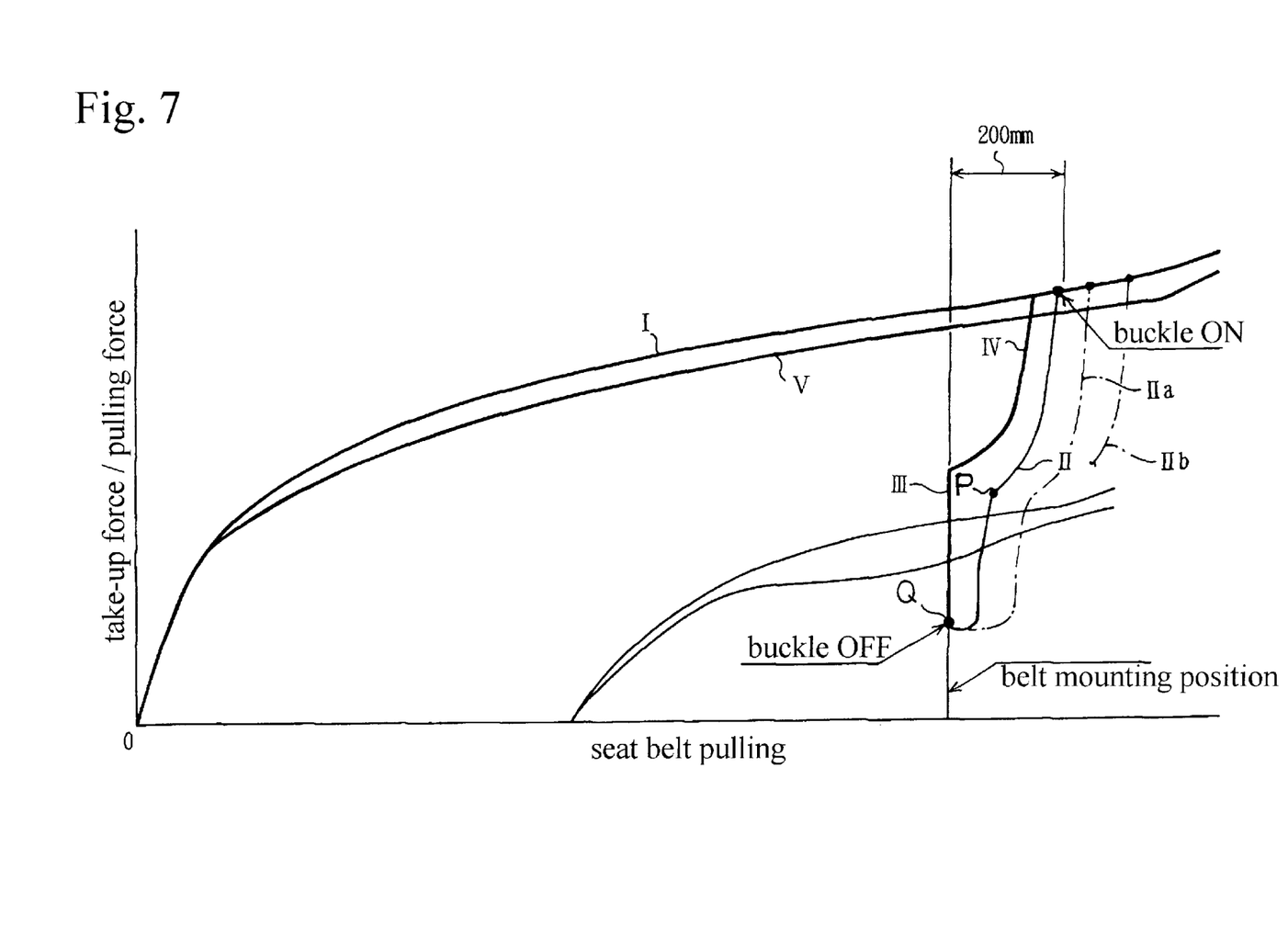
FIG. 7 is a drawing showing the characteristics of the take-up force/drawing-out force of a take-up device.
Figure 8:
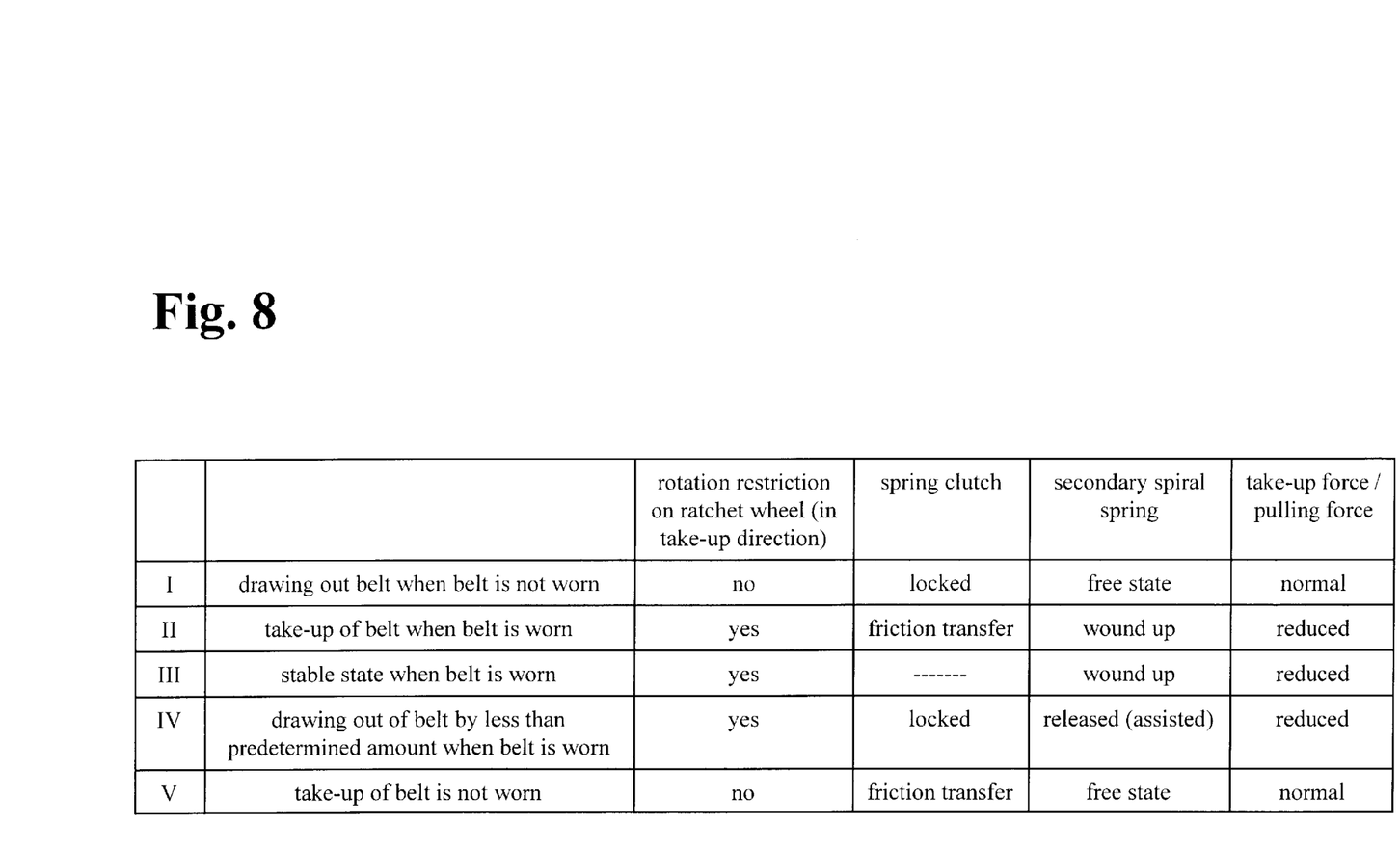
FIG. 8 is a table showing the status of various members in various operations

Referring to FIG. 7 and FIG. 8, the following is a description of the operations and advantages of take-up device 2.

1) When seatbelt 4 is drawn out to be worn by the passenger, take-up shaft 6 and take-up shaft 16 are rotated in the drawing-out direction b, causing spring clutch 25 to be wound tight. As a result, ratchet wheel 12 is rotated integrally with take-up shaft 16 in the drawing-out direction b by way of ring 14 and secondary spiral spring 13. Since ratchet wheel 12 is able to rotate freely, secondary spiral spring 13 is in a free state and no take-up rotation takes place. Thus, take-up shaft 16 does not receive rotational bias force in the drawing-out direction b. Referring specifically to FIG. 7, the curve (I) shows the characteristics of the drawing-out force for seatbelt 4, with only the rotational bias force (torque) from primary spiral spring 10 being applied.

2) Once seatbelt 4 is worn by the passenger, slack in seatbelt 4 is taken up. Take-up shaft 16 rotates in the take-up direction a, and the friction transfer provided by spring clutch 25 causes the rotation of take-up shaft 16 to be transferred to ring 14. Thus, ring 14 is rotated in the take-up direction a. Rotation restricting mechanism 26 restricts the rotation of ratchet wheel 12 in the take-up direction a, so when ring 14 rotates in the take-up direction a, secondary spiral spring 13 is wound tight, generating rotational bias force on take-up shaft 16 in the drawing-out direction b.

Referring to FIG. 7, the take-up force of take-up shaft 16 when reeling in the seatbelt 4 is reduced by the tightening of secondary spiral spring 13 and has the characteristics shown in curve (II). Thus, only a weak constraint is applied by seatbelt 4 to the passenger. However, as shown in curve (II), there is no slippage between clutch spring 15 and take-up shaft 16 up to a position P after starting of take-up, and the tightening of secondary spiral spring 13 is roughly completed during this interval. Starting with point P, slippage takes place between clutch spring 15 and take-up shaft 16 so that a braking effect is applied to the take-up operation.

3) When seatbelt 4 is fitted to the passenger, the winding of secondary spiral spring 13 becomes larger. The take-up force of take-up shaft 16 is reduced until it stops at point Q in FIG. 7. Thus, seatbelt 4 provides the passenger with a weak constraint and a comfortable fit.

Referring specifically to FIG. 7, the curve (IIa) and the curve (IIb) show slack elimination characteristics once seatbelt 4 is pulled out further and secured. In these cases, secondary spiral spring 13 is wound tight right after seatbelt 4 is secured. Thus, the take-up strength of take-up shaft 16 is reduced and the curves show similar characteristics as those of the curve (II). However, take-up shaft 16 will be rotated further in the take-up direction a compared to the curve (II), but there will be slippage between clutch spring 15 and take-up shaft 16 once secondary spiral spring 13 is tightened to the point that a predetermined rotational bias force is generated. Further tightening of secondary spiral spring 13 will not increase the rotational bias force. Thus, the constraint applied to the passenger once seatbelt 4 is fitted will be roughly similar to the constraint from the convergence of the curve (II).

4) If seatbelt 4 is drawn out when it is being worn by the passenger and secondary spiral spring 13 is in a range where it is wound tight, e.g., seat belt 4 has been drawn out 200 mm or less, take-up shaft 16 rotates in the drawing-out direction b, causing spring clutch 25 to be wound tight, i.e., in a transferring state. As a result, the rotational bias force in the drawing-out direction b generated by secondary spiral spring 13 is transferred to take-up shaft 16 by way of spring clutch 25. In other words, the take-up strength of take-up shaft 16 is assisted by the release elasticity of secondary spiral spring 13 and thereby reduced. The resulting characteristics are shown in curves (III) and (IV). Only a weak constraint is applied by seatbelt 4 to the passenger. If secondary spiral spring 13 is no longer wound tight, e.g., seatbelt 4 is drawn out 200 mm or more, the characteristics shown in the curve (I) in FIG. 7 take effect, and seatbelt 4 will be drawn out in opposition to the rotational bias force from primary spiral spring 10.

5) If seatbelt 4 is to be taken up again after it is drawn out while being worn by the passenger, the friction transfer provided by spring clutch 25 winds secondary spiral spring 13 tight, as described above. The tight state of secondary spiral spring 13 reduces the take-up strength of the take-up shaft 16. The resulting characteristics are similar to those shown in curve (II), curve (IIa), and curve (IIb). Thus only a weak constraint is applied to the passenger from seatbelt 4.

6) When seatbelt 4 is disengaged and is to be taken up, the restriction on ratchet wheel 12, provided by rotation restricting mechanism 26 to prevent rotation in the take-up direction a, is disengaged when seatbelt 4 is released. Thus, secondary spiral spring 13 is in a free state, and the energy stored due to its tightly wound state is released. In other words, immediately after seatbelt 4 is released, only the rotational bias force in the take-up direction a from primary spiral spring 10 is active on take-up shaft 16. Thus, the take-up strength of take-up shaft 16 increases rapidly. The resulting characteristics are shown in curve (V). Seatbelt 4 is rapidly reeled in.

With take-up device 2 as described above, seatbelt 4 is secured to the passenger and the rotation of ratchet wheel 12 in the take-up direction a is restricted. Then, when seatbelt 4 is taken in after the belt is secured, the take-up strength is reduced by having secondary spiral spring 13 wound tight (curve (II) from FIG. 7 and FIG. 8).

Furthermore, when seat belt 4 is to be drawn out, the release elastic force of secondary spiral spring 13 assists in the drawing out of seatbelt 4 (see curve (IV) from FIG. 7 and FIG. 8). When taking up the belt later, the take-up force is reduced since secondary spiral spring 13 is tightly wound (see curve (II) from FIG. 7 and FIG. 8). Thus, when seatbelt 4 is being worn, the pressure on the passenger from seatbelt 4 is significantly reduced, making seatbelt 4 much more comfortable.

Furthermore, the characteristics of secondary spiral spring 13 can be set freely based on the size of the biasing force from primary spiral spring 10. Thus, the biasing force from primary spiral spring 10 can be increased while still allowing secondary spiral spring 13 to provide reduced take-up force and assistance in the drawing out the belt. This improves the take-up performance of seatbelt 4. Also, the reduction in take-up force and the assistance in drawing out the belt provided by secondary spiral spring 13 can be set up in a stable manner that is not affected by vibrations and the like, thus providing a highly reliable take-up device. Also, when secondary spiral spring 13 is released, rotation of ratchet wheel 12 is restricted, thus eliminating ratchet noise.

The following is a description of alternative example of the embodiment described above.

1) In place of secondary spiral spring 13, the balance spring can be a torsion spring similar to secondary spiral spring 13.

2) Rotation restricting mechanism 26 is presented as one example of a rotation restricting mechanism, and various other types of mechanisms can be used instead.

3) Spring clutch 25 (clutch spring 15 and ring 14) can be omitted. If this is done, take-up shaft 16 can be connected directly to the inner end of secondary spiral spring 13. Roughly the same operations and advantages described above can be provided even with spring clutch 25 omitted. However, it would be desirable to have a plurality of secondary spiral springs 13 disposed in case take-up shaft 16 stops turning when seatbelt 4 is being worn and seatbelt 4 is reeled in after being drawn out too far. Since spring clutch 25 can be omitted, the structure can be simplified, thus reducing production costs.

The automotive seatbelt take-up device of the present invention is not restricted to the take-up device of the embodiment described above, and various modifications may be added as long as they do not depart from the spirit of the present invention.

According to an embodiment of the present invention, when the seatbelt is secured to the passenger and the seatbelt is then taken up, the balance spring is wound tight so that the take-up force is reduced. Also, when the seatbelt is subsequently drawn out, the balance spring that had been wound tight is released with a release elastic force that assists the take-up shaft in the drawing-out direction. By setting the spring characteristics of the balance spring appropriately, the reduction of the take-up force and the assistance provided for the drawing force can be set up freely. Thus, a greater degree of design freedom is provided, allowing a take-up device with superior features.

According to a feature of the present invention, when the seatbelt is secured to the passenger and the rotation of the ratchet wheel is restricted, the balance spring is wound tightly when the seatbelt is taken up after it is secured. This reduces the take-up force. When the seatbelt is drawn out, the release elastic force of the balance spring assists the drawing out of the seatbelt, thus allowing the tightly wound state of the balance spring to reduce the take-up force when the seatbelt is subsequently taken up. Thus, the pressure acting on the passenger from the seatbelt when the seatbelt is being worn is significantly reduced, and the comfort provided by the seatbelt is improved dramatically.

Furthermore, the balance spring characteristics can be set freely based on the degree of biasing force provided by the primary spiral spring. Thus, the reduction of the take-up force and the assistance in drawing out provided by the balance spring can be maintained while the biasing from the primary spiral spring is increased, and the take-up performance for the seatbelt is improved. The take-up force reduction and drawing-out assistance of the balance spring can be set up to have stable characteristics that are not affected by vibrations and the like. This provides a highly reliable take-up device.

According to another feature of the present invention, when the seatbelt is being worn, the balance spring is tightly wound so that the take-up force for taking up the seatbelt is reduced. This provides advantages similar as those described above.

According to a further feature of the present invention, when the seatbelt is being worn and the seatbelt is drawn out, the release elastic force of the balance spring assists the action in the drawing-out direction. Furthermore, when the balance spring is released, the ratchet wheel does not rotate so there is no ratchet noise. Other advantages are similar as those described above.

According to another feature of the present invention, when the seatbelt is being worn and is taken up after being drawn out, the balance spring is wound tight so that the take-up force for taking up the seatbelt is reduced. Other advantages are similar as those described above.

According to still another feature of the present invention, the balance spring is preferably formed from a spiral spring. For example, the balance spring can be interposed between the ring and the ratchet wheel so that the take-up device can be made compact. Other advantages are similar as those described above.

According to another feature of the present invention, the balance spring is preferably formed from a torsion spring. This allows the production costs of the balance spring to be reduced. Other advantages are similar as those described above.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An automotive seatbelt take-up device comprising:
    a take-up shaft operatively connected to a seatbelt take-up shaft;
    a primary spiral spring fixed to said take-up shaft, biasing said take-up shaft in a take-up direction;
    a spring clutch, including a ring and a clutch spring, fitted to the outside of take-up shaft, transferring rotation of said take-up shaft in a seatbelt drawing-out direction to said ring;
    a balance spring capable of generating a rotational bias force in a direction opposite to that of said primary spiral spring, one end of said balance spring being fixed to said ring;
    a ratchet wheel fixed to another end of said balance spring;
    restricting means capable of restricting said ratchet wheel, thereby preventing rotation in said seatbelt take-up direction;
    means effective when said ratchet wheel is restricted, for permitting said spring clutch to transfer friction in a direction to wind said balance spring tight, whereby a take-up force on said take-up shaft is reduced; and
    means, effective when said ratchet wheel is restricted to permit a release elastic force of said balance spring to assist, by way of said spring clutch, rotation of said take-up shaft in said drawing-out direction.

2. an automotive seatbelt take-up device as described in claim 1, wherein, when said seatbelt is taken up after being drawn out, said spring clutch provides friction transfer to wind said balance spring tight, thus reducing take-up force of said take-up shaft.

3. An automotive seatbelt take-up device as described in claim 1 wherein said balance spring is a spiral spring.

4. An automotive seatbelt take-up device as described in claim 1 wherein said balance spring is a torsion spring.

5. An automotive seatbelt take-up device as described in claim 1 wherein said primary spiral spring is fixed at an inner end portion of said take-up shaft.

* * * * *